United States Patent [19]

Uchikawa et al.

[11] Patent Number: 4,675,568
[45] Date of Patent: Jun. 23, 1987

[54] MECHANICAL AMPLIFICATION MECHANISM FOR ELECTROMECHANICAL TRANSDUCER

[75] Inventors: Tadao Uchikawa; Kunio Kitagawa, both of Tokyo, Japan

[73] Assignee: NEC Corporation, Japan

[21] Appl. No.: 765,044

[22] Filed: Aug. 12, 1985

[30] Foreign Application Priority Data

Aug. 13, 1984 [JP] Japan .............................. 59-169012
Aug. 13, 1984 [JP] Japan .......................... 59-123871[U]

[51] Int. Cl.⁴ ........................ H01L 41/08; B41J 3/12
[52] U.S. Cl. ................................ 310/328; 101/93.05;
101/93.48; 400/157.2
[58] Field of Search ............................... 310/323, 328;
346/139 A, 139 C, 141; 400/121, 124, 157.2;
101/93.04, 93.05, 93.48

[56] References Cited

U.S. PATENT DOCUMENTS

| | | | |
|---|---|---|---|
| 2,800,551 | 7/1957 | Crownover | 310/331 X |
| 2,835,761 | 5/1958 | Crownover | 310/331 X |
| 4,176,976 | 12/1979 | Lendl | 310/328 X |
| 4,193,703 | 3/1980 | Sakmann | 310/328 X |
| 4,435,666 | 3/1984 | Fukui et al. | 310/323 X |
| 4,523,866 | 6/1985 | Hirzinger et al. | 310/328 X |
| 4,547,086 | 10/1985 | Matsumoto et al. | 310/328 X |
| 4,570,095 | 2/1986 | Uchikawa | 310/328 |
| 4,622,484 | 11/1986 | Okihara et al. | 310/328 |

Primary Examiner—Mark O. Budd
Attorney, Agent, or Firm—Laff, Whitesel, Conte & Saret

[57] ABSTRACT

A piezoelectric transducer for a printing pin of a dot-matrix or an armature of a relay drives a mechanical amplification mechanism having a base plate with a reference wall that is to be fixed to a frame. An elongated piezoelectric transducer element extends in the direction of its expansion between the base plate and a lever arm. A lever arm has a first end portion coupled to an end of the piezoelectric transducer element, which is remote from the base plate. The lever arm is fixed to the second portion of the base plate by a fulcrum member located at a position near the first end. A band spring has one end coupled between the second end portion of the lever arm and the base plate. An actuating element is fixed to substantially a central portion of the spring. The actuating element may be either a printing pin of a dot-matrix or the moving contact of a relay.

4 Claims, 9 Drawing Figures

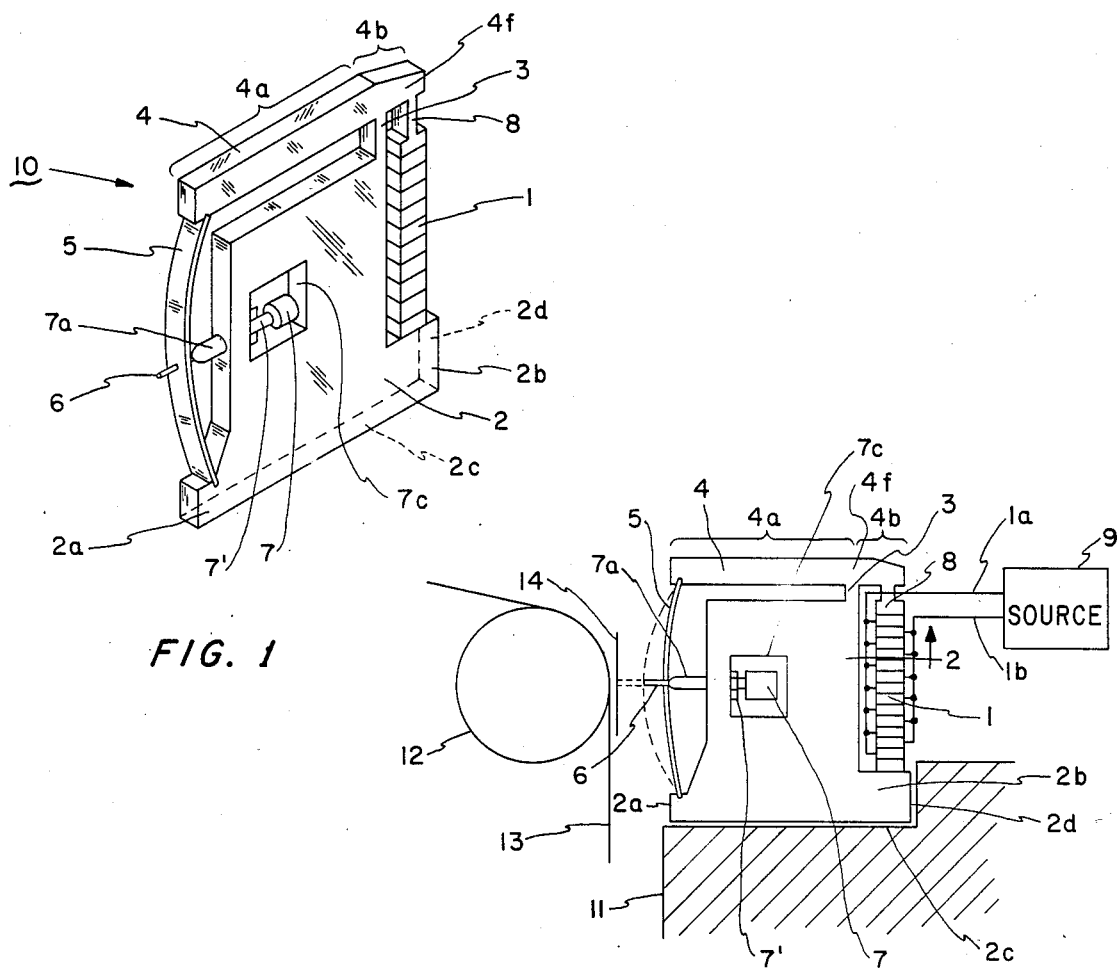
FIG. 1
FIG. 2
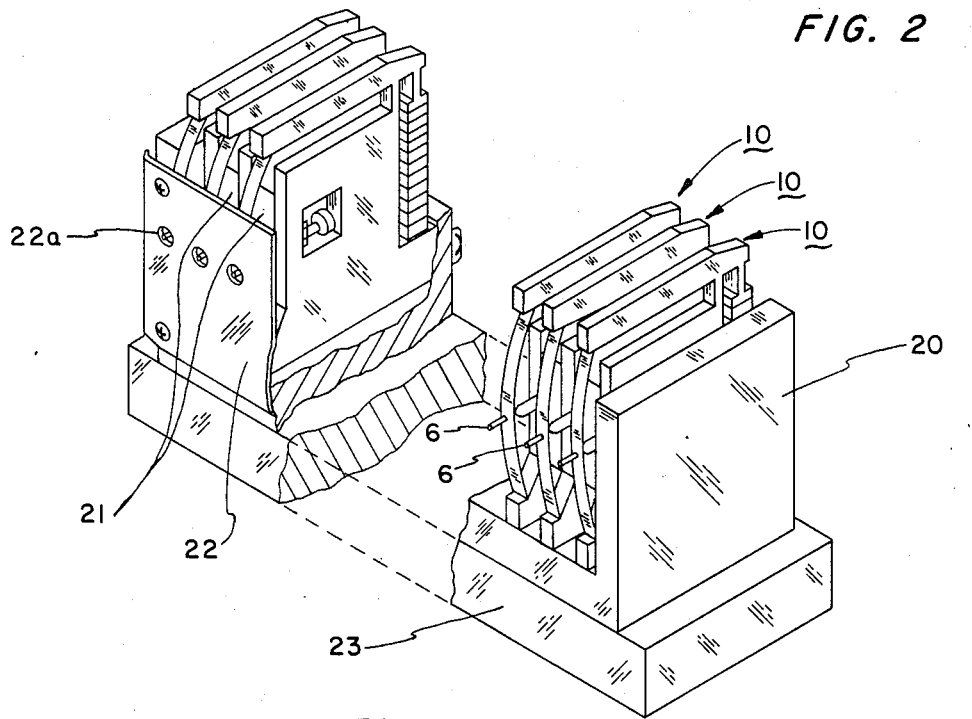
FIG. 3

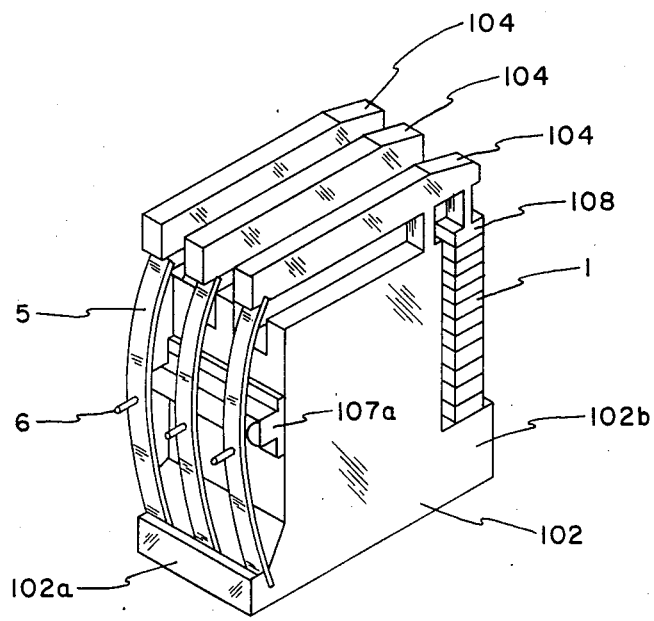
FIG. 4
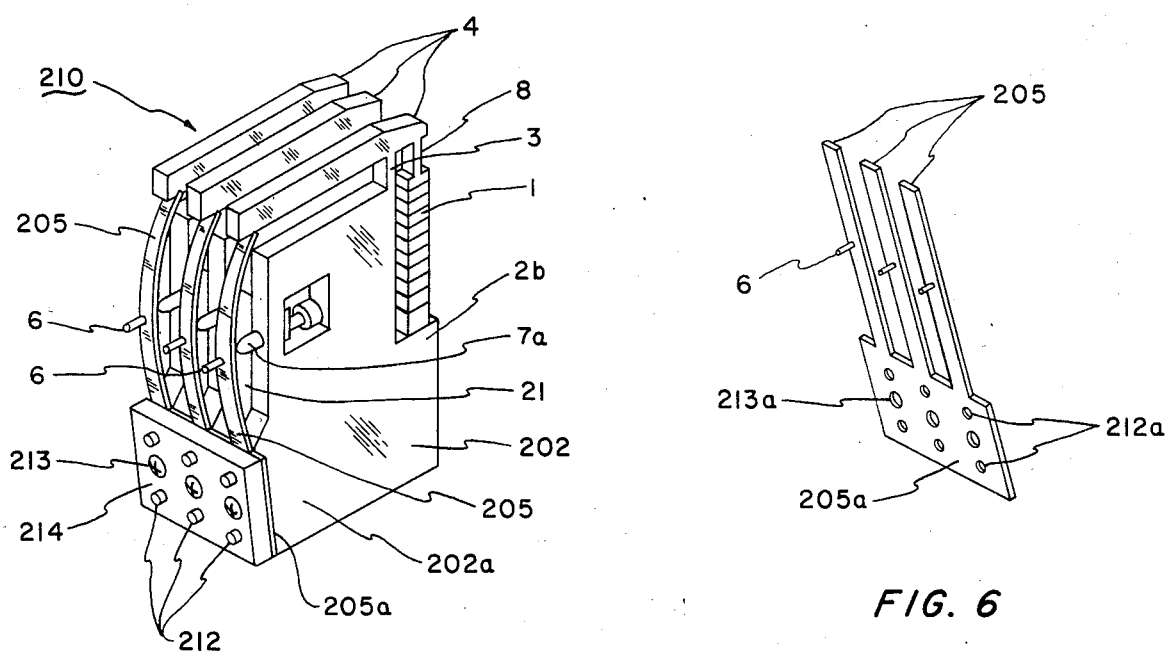
FIG. 5
FIG. 6

MECHANICAL AMPLIFICATION MECHANISM FOR ELECTROMECHANICAL TRANSDUCER

BACKGROUND OF THE INVENTION

The present invention relates to a mechanical amplification mechanism for amplifying the motion of an electromechanical transducer element. More particularly, the invention relates to a mechanical amplification mechanism which amplifies a displacement of a piezoelectric element used as a driving source and which is suited for a printer head or a mechanical switch.

A piezoelectric transducer with a mechanical amplification mechanism has been used as a printer head of a dot-type line printer or a serial printer and has also been used as a mechanical switch, such as a relay. The printer head employing a piezoelectric transducer element as a driving source has reduced both power dissipation and the quantity of heat generation and a high-speed operation is realized. Since displacement of the piezoelectric transducer element is very slight, e.g. 0.005 mm to 0.01 mm, it should be amplified by a mechanical amplification mechanism, to an extent of 50 to 100 times, so that a sufficient printing needle stroke, e.g. 0.5 mm, may be obtained in the dot-printing head.

A piezoelectrically driven printer head is disclosed in the U.S. Pat. No. 4,193,703 entitled "Matrix Printer with Piezoelectrically Driven Printing Needles", and issued to Walter Sakmann on Mar. 18, 1980. The mechanism of this patent comprises a holding part having bent portions at both of its ends. A piezoelectric crystal is fixed, at its first end, to one of the bent portions. A buckling spring is provided between the other of the bent portions and a second end of the piezoelectric crystal. A printing needle is secured to the central portion of the buckling spring. The buckling spring is deflected by exciting the piezoelectric crystal to drive the printing needle.

In such a mechanism, the magnitude of deflection $\delta$ of the central portion of the buckling spring, i.e., the printing stroke, is geometrically approximated to $$\delta = \frac{2}{\pi} \sqrt{l\epsilon}$$

where $\epsilon$ denotes the elongation of the piezoelectric crystal and $l$ the length of the buckling spring. Assuming that $\epsilon = 0.01$ mm, by way of example, it is not possible to make $\delta = 0.5$ mm unless $l = 60$ mm. Moreover, since the elongational force of the piezoelectric crystal also acts on the holding part, the holding part is deformed to open outwardly so that the displacement to be transmitted to the buckling spring suffers a loss. After all, the length of the buckling spring should be as long as 100 mm or more. Accordingly, this structure has the disadvantage that the size of the printing mechanism becomes quite large.

To solve this problem, one of the inventors of the present invention has described a mechanical amplification mechanism which is disclosed in the U.S. patent application Ser. No. 591,981, filed on Mar. 27, 1984 and is assigned to the same assignee. The mechanism includes two lever arms respectively fixed to two movable ends of a piezoelectric element. These arms extend perpendicularly to the direction of expansion and contraction of the piezoelectric element. Free ends of those arms hold a band spring therebetween. The band spring has an acting element such as a printing needle or a switch terminal at its central portion. Each of the two lever arms is pivotably supported on a base plate by a fulcrum member located at the position between the fixed end and the free end of the lever arm. The base plate is fixed to a frame member to install the amplification mechanism. Accordingly, the two lever arms turn aorund the fulcrum members in response to an expansion of the piezoelectric element, so that their free ends approach each other. As a result, the two lever arms bend the band spring forwardly, thus causing the acting element to be driven in the direction perpendicular to the expanding direction of the piezoelectric element.

According to this mechanism, the expansion of the piezoelectric element is amplified by the two lever arms and the band spring. Therefore, a sufficient stroke, e.g., 0.6 mm, of the acting element can be obtained with the small-sized mechanism, which is necessary for a printer head and a relay.

However, the lever arms are connected to the base plate with small contacting portions defined by the fulcrum members. Moreover, the piezoelectric element and the band spring are supported by the two ends of the lever arms. Therefore, the lever arms and the band spring tends to be distorted with respect to the base plate. As a result, it is difficult to keep the actuating element in a stable and precise position with respect to the base plate which is fixed to the frame or housing. In particular, where a plurality of the printer heads are arrayed in parallel as applied to a line printer, it is difficult to array a plurality of the actuating elements in a line with high precision.

Further, the base plate is surrounded by the piezoelectric element and movable members, i.e., lever arms and band spring. It must hang in the space on a shaft-like member in order to install the mechanism. Therefore, the installation can not easily be carried out and high precision cannot be realized for the positioning adjustment of the mechanism.

SUMMARY OF THE INVENTION

Therefore, an object of the present invention is to provide a mechanical amplification mechanism which allows the actuating element to have the stable and precise relationship to the base member.

Another object of the present invention is to provide a mechanical amplification mechanism which is easy to install within a frame of an apparatus such as a printer or a relay.

A mechanical amplification mechanism, according to the present invention, comprises a base plate having a first portion with a reference wall to be fixed to a frame. A second portion of the base plate is remote from the first portion, in a first direction. An elongated piezoelectric transducer element extending in the direction of expansion and having a first end, with respect to the direction of expansion, fixed to the first portion of the base plate. The piezoelectric transducer element is arranged so that the direction of its expansion is in parallel with the first direction. An electric voltage is applied to the piezoelectric transducer element to expand it. A lever arm has a first end portion coupled to the second end of the piezoelectric transducer element, which is opposite the first end. The second end portion of the lever arm is opposite the first end portion and the longitudinal axis of the lever is disposed in a second direction which is substantially perpendicular to the first direction. The lever arm is fixed to the second portion of the base plate by a fulcrum member located at a position near the first end portion. A band spring has one end coupled to the second end portion of the lever arm and the other end fixed to the first portion of the base plate. An actuating element is fixed to substantially a central portion of the spring.

BRIEF DESCRIPTION OF THE DRAWINGS

The above-mentioned and other objects, features and advantages of the present invention will be better understood from the following detailed description of preferred embodiments taken in conjunction with the accompanying drawings, wherein;

FIG. 1 is a perspective view of a printing head mechanism according to a first embodiment of the present invention;

FIG. 2 is a side view of the printing head mechanism shown in FIG. 1;

FIG. 3 is a perspective view of a printing head arrangement for a line printer employing a plurality of the printing heads shown in FIG. 1;

FIG. 4 is a perspective view of a printing head arrangement according to a second embodiment of the present invention;

FIG. 5 is a perspective view of a printing head arrangement according to a third embodiment of the present invention;

FIG. 6 is a perspective view of a band spring arrangement employed in the printed head arrangement shown in FIG. 5;

DESCRIPTION OF THE PREFERRED EMBODIMENTS

Figure 7:
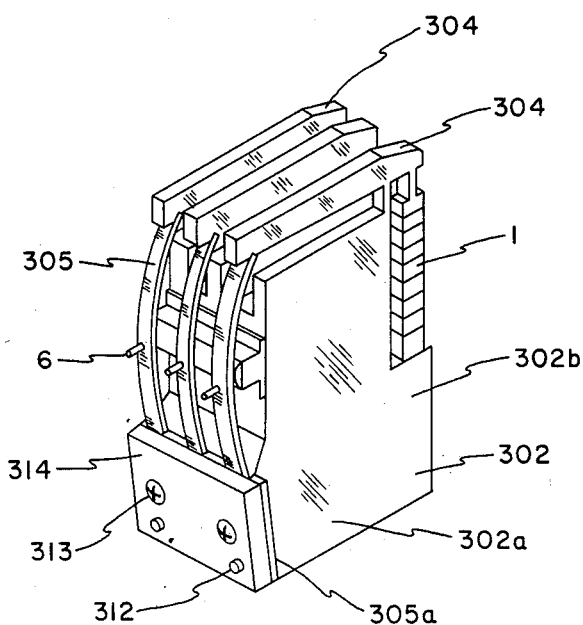
FIG. 7 is a perspective view of a printing head arrangement according to a fourth embodiment of the present invention.

FIG. 1 shows printing head 10 with a mechanical amplification mechanism according to a first embodiment of the present invention. The head includes a piezoelectric transducer element 1, a base plate 2 for supporting the piezeoelectric element 1, a lever arm 4 connected to the upper side of the base plate 2 by a fulcrum member 3, a band spring 5 fixed at one end to the base plate 2 at its one end and coupled to the lever arm 4 at its other end a printing needle 6 is secured to the central portion of the band spring 5.

The piezoelectric transducer element 1 includes a plurality of unit elements made of a piezoelectric material such as lead titanate zirconate which is arranged electrically in parallel and mechanically in series. The piezoelectric transducer element 1 is disclosed in the U.S. Pat. No. 4,523,121. The base plate 2 had an arm-holding portion 2a at its lower front end and a transducer-supporting portion 2b at its lower rear end. The base plate 2 further has an aperture 7c containing an adjusting screw 7 for the band spring 5. The front end of screw 7, (back stopper) 7a, presses the rear surface of the central portion of the band spring 5 so that the spring 5 is slightly bent or bowed in the front direction. The screw 7 engages a nut 7' secured to the front inner wall of the aperture 7c. The lever arm 4 has a fulcrum point 4f which is fixed to the base plate 2 by the fulcrum member 3. Fulcrum point 4f is divided into two portions: a working arm 4a with an end portions coupled to the band spring 5 and an actuating arm 4b with an end portion coupled to the transducer element 1 by a holding element 8 which extends downwardly. The longitudinal direction of the working arm 4a is longer than the longitudinal direction of actuating arm 4b.

The lower surface of the piezoelectric element 1 is fixed to the transducer-supporting portion 2b and the upper surface of element 1 is coupled to the holding element 8. The upper and lower ends of the band spring 5 are fixedly secured to the front ends of the working arm 4a and the arm-holding portion 2a. To this end, the working arm 4a and the arm-holding portion 2a have grooves to engage the ends of the spring 5.

In this embodiment, the base plate 2, the fulcrum member 3, the lever arm 4, and the holding element 8 are integrally made of an elastic material such as spring steel and a carbonaceous material. The integral member can be mass-produced by a punch press, etching or a wire-cutting method. The fulcrum member 3 and the holding element 8 may also be made of ceramics.

The lower side wall 2c and rear side wall 2d of the base plate 2 is fixed to a frame member 11 (FIG. 2) in order to install the printing head mechanism or hammer 10 in a printer assembly. Namely, the printing head mechanism 10 is installed on the frame 11 with the walls 2c and 2d serving as fixed positional references. Therefore, the installation of the mechanism 10 can easily be carried out and the position of the printing needle 6 is precisely determined with respect to the frame 11.

Referring to FIG. 2, the printing head mechanism or hammer 10 is provided on a frame 11 so as to be located opposite the platen 12 of a printer assembly. A print paper 13 and an inked ribbon 14 are provided in the gap between the platen 12 and the printing needle 6. A pair of electrodes 1a and 1b of the piezoelectric element 1 are connected to an electric source 9.

When electric source 9 applies a voltage in one polarity to the pair of electrodes 1a and 1b of the piezoelectric element 1, the element 1 expands in its longitudinal direction. Since the lower end of the element 1 is rigidly fixed to the transducer-supporting portion 2b, the element 1 expands only upwardly. The displacement of the element 1 is transmitted to the actuating arm 4b by way of the holding element 8 to enable the lever arm 4 to turn downwardly about the fulcrum point 4f. Accordingly, the front end of the lever arm 4 moves downwardly by the distance which is determined by the displacement of the element 1, and the ratio between the lengths of the working and actuating arms 4a and 4b. Thus, the displacement of the element 1 is amplified and transmitted to the front end of the lever arm 4.

The movement of the lever arm 4 makes the band spring 5 bend ahead (to the left in FIG. 2), as shown in the dotted line. This bending causes the maximum deflection at the central portion of the band spring 5. Accordingly, the band spring 5 enables the printing needle 6 to more or protrude ahead and to print one dot on the paper 13, via the inked ribbon 14.

In a concrete example of the above embodiment, the lengths of the components are as follows:
the piezoelectric element 1: 25 mm,
the actuating arm 4b: 6 mm,
the working arm 4a: 36 mm, and
the band spring 5: 40 mm.

In this structure, the printing stroke obtained by the needle 6 is 0.5 mm, while the displacement of the piezoelectric element 1 is 0.01 mm.

By stoppingg the application of the voltage to the piezoelectric element 1, it returns to the initial length. Simultaneously, the lever arm 4 also returns to its initial position, and the band spring 5 returns until it is stopped by the back stopper 7a.

In this mechanism, the lower side of base plate 2 has rigid arm-holding portion 2a and transducer-supporting portion 2b for holding one end of both the band spring 5 and piezoelectric element 1. The lever arm 4 is provided on the upper side of the base plate 2. Therefore, a stable and precise positioning of the printing needle 6 can be performed with reference to the base plate 2.

The foregoing printing head 10 can be used as a hammer for a line printer. In this case, as shown in FIG. 3, a plurality of the heads 10 are assembled in parallel and fixed together by means of a common housing 20. A plurality of spacers 21 are inserted between the adjacent base plates of the heads 10 so that the distance between the adjacent printing needles 6 is set at 2 mm. The housing 20 has a ribbon guide plate 22 in which a plurality of through holes 22a are formed as the passageway for each printing needle 6. Therefore, each of the printing needles 6 protrudes through the corresponding hole 22a to print one dot when the corresponding piezoelectric element 1 is energized.

The housing 20 is mounted on a shuttle mechanism 23 which is subjected to a reciprocating motion along the printing line. The shuttle mechanism 23 is well known in the art, as disclosed in the U.S. Pat. No. 3,941,051, and its detailed description is omitted.

In this arrangement, a plurality of printing needles 6 can be precisely arrayed in a line since a set of the hammer mechanisms 10 are mounted on the common housing 20 with the lower and rear surfaces 2c and 2d serving as fixed positioned references.

Referring to FIG. 4, a plurality of the base plates 102 and the lever arms 104 are arranged in parallel and can be made integrally as one block either by punch press or a wire-cutting method. A plurality of individual band springs 5 are fixed to a common arm-holding portion 102a of the integral base plate block 102 and the respective lever arms 104. A common back stopper 107a is provided on the front wall of the base plate block 102 to give band springs 5 a slight pre-bend. A plurality of piezoelectric elements 1 are fixed to a common transducer-supporting portion 102b L and respective holding elements 108. This assembly is also mounted on the shuttle mechanism 23 shown in FIG. 3.

In this embodiment, one end of each of the band springs 5 is fixed to the common arm-holding portion 102a. Therefore, the printing needles 6 can be arrayed in a line more precisely. Further, the housing 20 shown in FIG. 3 can be omitted.

Referring to FIGS. 5 and 6, a plurality of band springs 205 are combined together at one ends by a common end plate 205a to form the band spring sub-assembly like a comb-shaped spring. This band spring sub-assembly is integrally made of one spring plate by either a punch press or a wire-cutting method. A plurality of heads 210 are mounted on the housing 20, similarly to the head mechanism arrangement shown in FIG. 3. The heads are arrayed in parallel, with a certain distance between them fixed by means of the spacers 21. Each of the base plates 202 has two pins 212 and a screw hole (not shown) between the pins 212 at the front surface of its arm-holding portion 202a.

As shown in FIG. 6, the common end plate 205a has plurality of sets of two pin holes 212a and a screw hole 213a. Each set of holes is formed under each band spring 205 at the positions corresponding to the pins 212 and the screw hole of the arm-holding portion 202a. The end plate 205a with a plurality of band springs 205 is attached onto the arm-holding portions 202a with the pins 212 being inserted in the respective pin holees 212a. Then, the plate 205a is fixed thereto by a cramp plate 214 and screws 213. Next, free ends of the band springs 205 are fixed to respective lever arms 4 as shown in FIG. 5.

In this embodiment, the installation of the band springs 205 is simplified and more precise positioning of the printing needles 6 is realized.

Referring to FIG. 7, the printing head mechanism arrangement, according to a fourth embodiment, has the features of the second and third embodiments. That is, a plurality of base plates 302 and lever arms 304 are integrally made. A plurality of band springs 305 has a common end plate 305a at one of their ends. The end plate 305a is fixed to an arm-holding portion 302a of a base plate block 302 by a clamp plate 314. The free ends of the band springs 305 are fixed to the respective lever arms 304.

Figure 8:
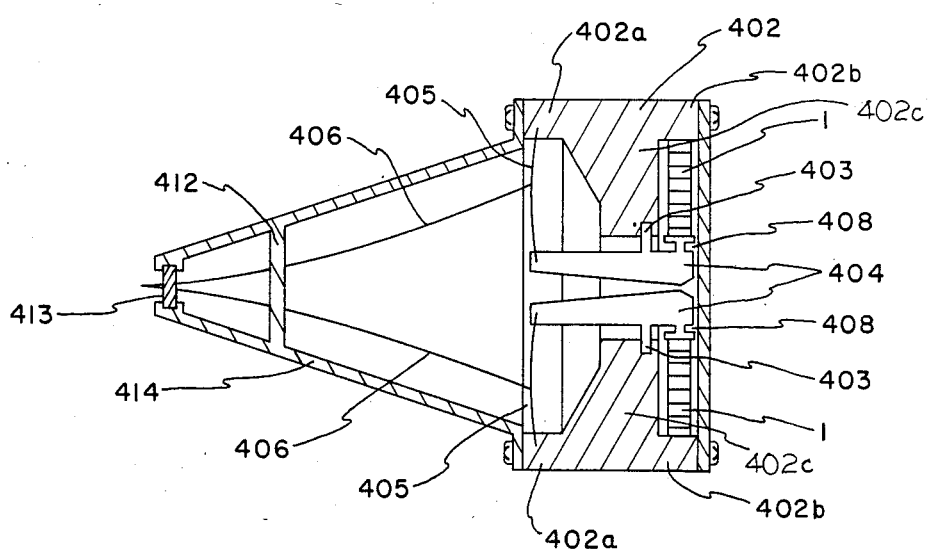
FIG. 8 is a perspective view of a printing head mechanism for a serial printer according to a fifth embodiment of the present invention.

The printing head mechanism shown in FIG. 1 can also be applied to a serial printer. As shown in FIG. 8, a cylindrical base 402 includes a cylindrical arm-holding portion 402a, a cylindrical transducer-supporting portion 402b, and a cylindrical lever-holding portion 402c which is provided between the two portions 402a and 402b. Part 402c protrudes inwardly beyond the portions 402a and 402b, so that it functions as the base plate 2 of the first embodiment. A plurality of lever arms 404 are fixed to the inner wall of the cylindrical lever-holding portion 402c by fulcrum members 403 so as to extend in the direction of the axis of the base 402. Each of the lever arms 404 has a holding element 408 at its actuating arm portion to hold a piezeoelectric element 1 whose opposite end is fixed on the common transducer-supporting portion 402b. Each of the front ends of the lever arms 404 has a band spring 405 whose other end is fixed in the common arm-holding portion 402a. Thus, a set of the head mechanisms are radially arranged in the cylindrical base 402.

Each of the band springs 405 has a printing wire 406 at its central position. The wires 406 pass through a first wire guide 412 and reach a second wire guide 413. The front ends of the wires 406 are arrayed in a line or two lines by the second wire guide 413. The first and second wire guides 412 and 413 are supported by a conical housing 414 fixed to the arm-holding portion 402a. Such a wire arrangement is well known in the art as disclosed in the U.S. Pat. No. 3,900,094, and therefore, a further description of it is omitted.

Figure 9:
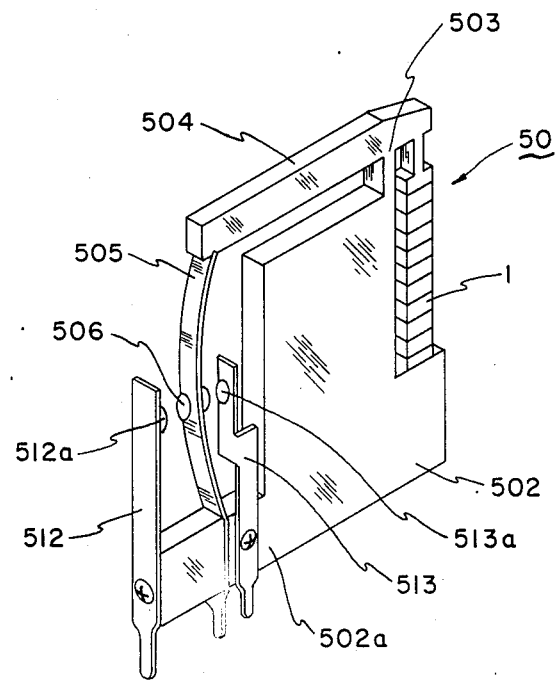
FIG. 9 is a perspective view of a relay mechanism according to a sixth embodiment of the present invention.

The mechanical amplification mechanism of the present invention can be applied to a relay mechanism. Referring to FIG. 9, the relay mechanism 50 is similar to the printing head mechanism 10 shown in FIG. 1 except that, instead of the printing needle 6, a movable electric contact 506 is provided on the center of the spring band 505, as an acting element. Metal plates 512 and 513 are located at front and rear sides of the band spring 505 and are fixed by insulating members to an arm-holding portion 502a. The metal plates 512 and 513 have electric contacts 512a and 513a, respectively.

Also in such a relay mechanism 50, a lever arm 504 is driven about a fulcrum 503 by the expanding and contracting operation of the piezoelectric element 1. Accordingly, the buckling deformation of the band spring 505 causes the movable contact 506 to come into contact with the fixed contact 512a or 513a, thereby effecting the relay operation.

The relay mechanism 50 has a large contact displacement and pressure. Further, since the movable contact 506 and the fixed contacts 512a and 513a are directly fixed to the arm portion 502a, the movable contact 506 can be precisely located with respect to the fixed contacts 512a and 513a. Therefore, a long lifetime and high reliability can be obtained.

As described above, the mechanical amplification mechanism according to the present invention has a base plate which fixedly supports one end of each piezoelectric element and a band spring and a lever arm which is pivotably fixed to the base plate. Accordingly, the mechanical amplification mechanism can be easily mounted on a frame member with high precision. Further, the actuating element can be stably and precisely positioned.

What is claimed is:

1. A printing head mechanism arrangement for use in a serial printer comprising:
    a cylindrical base member having first and second cylindrical portions, and a third cylindrical portion located between said first and second cylindrical portions, said third cylindrical portion protruding inwardly beyond the inner walls of said first and second cylindrical portions;
    a plurality of lever arms fixed at their fulcrum points to the inner walls of said third cylindrical portion so as to extend in the axial direction of said cylindrical base member, each of said lever arms having first and second end portions, each of said fulcrum points being located at a position which is closer to said first end portion than to said second end portion;
    a plurality of piezoelectric elements having first end surfaces fixed to said first cylindrical portion of said base member and second end surfaces coupled to the first end portions of said lever arms,
    a plurality of band springs each having a printing wire at substantially its central portion, one end of each of said band springs being fixed to said second cylindrical portion of said base member and the other end of each of said band springs being coupled to the second end portions of said lever arms, and
    a wire guide for gathering a plurality of front ends of the printing wires.

2. A printing head mechanism for use in a line printer, said printing head comprising:
    a plurality of base plates for supporting a plurality of individual printing head mechanisms which are arrayed in parallel, each of said base plates having a reference side and an actuating side which are located on opposite sides thereof, said reference side including an arm-holding portion, an element-supporting portion located opposite said arm-holding portion;
    a comb-shaped spring including a plurality of band springs and an end plate connected to first end of said band springs;
    means for fixing said end plate of said comb-shaped spring to the arm-holding portions of said base plates;
    a plurality of printing needles fixed at central portions of said band springs of said comb-shaped spring, respectively, said plurality of printing needles being array in line;
    a plurality of lever arms respectively provided with fulcrum members on the actuating sides of said base plates, the longitudinal axes of said lever arms being substantially parallel to each actuating side, each of said lever arms having first and second portions with said fulcrum member serving as a positional boundary, said first portions being longer than said second portions;
    means for fixing second ends of said band springs of said comb-shaped spring to ends of the first portions of said lever arms, respectively; and
    a plurality of piezoelectric elements oriented to expand and contract along longitudinal axes thereof in response to applications of operating voltages thereto, said piezoelectric elements being disposed between ends of the second portions of said lever arms and the element-supporting portions of said base plates, respectively.

3. A printing head mechanism for use in a line printer, said printing head comprising:
    a single base block for supporting a plurality of printing head mechanisms, said base block having a reference side and an actuating side which is remote from said reference side with respect to a first direction, said reference side including a common spring-holding portion, an element-supporting portion which is remote from said common spring-holding portion with respect to a second direction which is perpendicular to said first direction, said base block further having a plurality of fulcrum members on said actuating side;
    a plurality of lever arms respectively fixed to said fulcrum members, the longitudinal axes of each of said lever arms being disposed in said second direction, each of said lever arms having first and second portions with said fulcrum member serving as a positional boundary, said first portions being longer than said second portions;
    a plurality of piezoelectric elements fixed between the second portions of said lever arms and said element-supporting portion of said base block, respectively; and
    a plurality of band springs, each of said band springs having a printing needle at substantially its central portion, one end of each of said band springs being fixed to the first portion of an associated one of said lever arms, and the other ends of said band springs being fixed to said common spring-holding portion of said base block.

4. The printing head mechanism as claimed in claim 3, further comprising means fixed to said base block for pre-deflecting said band springs in the moving direction of said printing needles.

* * * * *